United States Patent
Jung et al.

(10) Patent No.: US 8,982,023 B2
(45) Date of Patent: Mar. 17, 2015

(54) ARRAY SUBSTRATE AND DISPLAY DEVICE HAVING THE SAME

(75) Inventors: Kwang-Chul Jung, Seongnam-si (KR); Joo-Nyung Jang, Gyeongsan-si (KR); Hee-Seop Kim, Hwaseong-si (KR); Chong-Chul Chai, Seoul (KR); Mee-Hye Jung, Suwon-si (KR); Hwa-Sung Woo, Suwon-si (KR); Cheol Shin, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 1165 days.

(21) Appl. No.: 12/701,759

(22) Filed: Feb. 8, 2010

(65) Prior Publication Data

US 2010/0207856 A1 Aug. 19, 2010

(30) Foreign Application Priority Data

Feb. 16, 2009 (KR) .................. 10-2009-0012448

(51) Int. Cl.
*G02F 1/1343* (2006.01)
*G02F 1/1362* (2006.01)

(52) U.S. Cl.
CPC .... *G02F 1/134363* (2013.01); *G02F 1/136213* (2013.01); *G02F 1/13624* (2013.01); *G02F 2001/134372* (2013.01)
USPC ............................................ 345/87; 349/141

(58) Field of Classification Search
USPC ........... 345/87, 98, 100, 103, 104, 76, 84, 48, 345/50; 349/139
See application file for complete search history.

(56) References Cited

U.S. PATENT DOCUMENTS

| | | |
|---|---|---|
| 6,856,371 B2 | 2/2005 | Kim et al. |
| 2004/0114084 A1* | 6/2004 | Kim et al. ............ 349/143 |
| 2007/0080370 A1 | 4/2007 | Miyachi et al. |
| 2009/0079892 A1* | 3/2009 | Hsien et al. ............ 349/47 |
| 2009/0262106 A1* | 10/2009 | Lu et al. ............ 345/214 |
| 2010/0109994 A1* | 5/2010 | Lee et al. ............ 345/98 |

FOREIGN PATENT DOCUMENTS

| | | |
|---|---|---|
| CN | 1598675 A | 3/2005 |
| CN | 1912719 A | 2/2007 |
| JP | 07092504 A | 4/1995 |
| JP | 2005062276 A | 3/2005 |
| JP | 2005208609 A | 8/2005 |
| JP | 2006317926 A | 11/2006 |
| KR | 1020050063714 A | 6/2005 |
| KR | 1020060001425 A | 1/2006 |
| KR | 1020070019377 A | 2/2007 |
| KR | 1020070035373 A | 3/2007 |
| WO | 2005059637 A1 | 6/2005 |

\* cited by examiner

*Primary Examiner* — William Boddie
*Assistant Examiner* — Jeffrey A Parker
(74) *Attorney, Agent, or Firm* — Cantor Colburn LLP

(57) ABSTRACT

An array substrate includes a first pixel electrode and a second pixel electrode. The first pixel electrode includes first branch electrode portions and second branch electrode portions. The first branch electrode portions are disposed in a first area of a unit pixel area and are substantially parallel to a first side of the unit pixel area. The second branch electrode portions are disposed in a second area of the unit pixel area and are substantially parallel to a second side of the unit pixel area. The second pixel electrode includes third branch electrode portions disposed between the first branch electrode portions and fourth branch electrode portions disposed between the second branch electrode portions.

14 Claims, 15 Drawing Sheets

ARRAY SUBSTRATE AND DISPLAY DEVICE HAVING THE SAME

This application claims priority to Korean Patent Application No. 2009-12448, filed on Feb. 16, 2009, and all the benefits accruing therefrom under 35 U.S.C. §119, the contents of which in its entirety are herein incorporated by reference.

BACKGROUND OF THE INVENTION

1. Field of the Invention

The present invention relates to an array substrate and a display device having the array substrate. More particularly, the present invention relates to an array substrate having a substantially horizontal electric field and a display device having the array substrate.

2. Description of the Related Art

A liquid crystal display ("LCD") device is a widely used type of flat panel display device. An LCD device typically includes two display substrates having electrodes, such as a pixel electrode and a common electrode, for generating an electric field disposed thereon, and a liquid crystal layer disposed between the two display substrates. When a voltage is applied to the electrodes, an electric field is generated in the liquid crystal layer. An arrangement of liquid crystals in the liquid crystal layer is controlled by the electric field, and a transmittance and polarization state of incident light are thereby controlled to display an image on the LCD.

Obtaining a wide viewing angle and a fast response time of the liquid crystal layer is an important issue in LCD technology. Accordingly, a multi-domain technique has been developed, wherein the liquid crystals are arranged in multiple directions in a unit pixel area having a multi-domain structure. In addition, shapes of the electrodes which generate the electric field have been altered in attempts to improve the viewing angle and/or response time of the LCD.

However, the liquid crystals in a boundary area of domains of the multi-domain structure are insufficiently controlled, and textures are generated in the boundary area, thereby substantially decreasing light transmittance, causing a substantially deterioration of the display quality of the LCD. In addition, an amplitude of a driving voltage applied to the electrodes is substantially limited, due to a width of a line which delivers a signal to a switching element of the LCD. As a result, it is impossible to increase a voltage potential difference of the electric field applied to the liquid crystal layer to enhance the response time of the LCD device and/or to effectively drive the LCD using low and high driving voltages thereof.

BRIEF SUMMARY OF THE INVENTION

Exemplary embodiments provide an array substrate having substantially decreased textures, resulting in significantly enhanced transmittance and response time of liquid crystals therein, thereby substantially enhancing a display quality thereof.

Exemplary embodiments also provide a display device having the array substrate.

According to an exemplary embodiment, an array substrate includes a first pixel electrode and a second pixel electrode. The first pixel electrode includes a first supporting electrode portion, a first branch electrode portion, a second branch electrode portion, a third branch electrode portion and a fourth branch electrode portion. The first branch electrode portions extend from the first supporting electrode portion along a first direction forming an acute angle with a longitudinal axis of the first supporting electrode portion. The second branch electrode portions extend from the first supporting electrode portion along a second direction crossing the first direction. The third branch electrode portion extends from the second branch electrode portion adjacent to the first branch electrode portion substantially parallel to the first branch electrode portion. The fourth branch electrode portion extends from the third branch electrode portion substantially parallel to the second branch electrode portion. The second pixel electrode includes a second supporting electrode portion, a fifth branch electrode portion and a sixth supporting electrode portion. The second supporting electrode portion faces the first supporting electrode portion. The fifth branch electrode portions extend from the second supporting electrode portion between the first branch electrode portion and the third branch electrode portion and between the first branch electrode portions. The sixth branch electrode portions extend between the second supporting electrode portion and the fourth supporting electrode portion and between the second branch electrode portions.

According to an alternative exemplary embodiment, an array substrate includes a first pixel electrode and a second pixel electrode. The first pixel electrode includes a first branch electrode portion and a second branch electrode portion. The first branch electrode portions are disposed in a first area of a unit pixel area and aligned substantially parallel to a first side of the unit pixel area. The second branch electrode portions are disposed in a second area of the unit pixel area and aligned substantially parallel to a second side of the unit pixel area. The second side adjacent to the first side, and longitudinal axes of the first side and the second side are substantially perpendicular to each other. The second pixel electrode includes a third branch electrode portion and a fourth branch electrode portion. The third branch electrode portions are disposed between the first branch electrode portions. The fourth branch electrode portions are disposed between the second branch electrode portions.

According to another alternative exemplary embodiment, a display device includes an array substrate, an opposite substrate and a liquid crystal layer disposed therebetween. The array substrate includes a first pixel electrode and a second pixel electrode. The first pixel electrode includes a first supporting electrode portion, a first branch electrode portion, a second branch electrode portion, a third branch electrode portion and a fourth branch electrode portion. The first branch electrode portions extend from the first supporting electrode portion along a first direction forming an acute angle with a longitudinal axis of the first supporting electrode portion. The second branch electrode portions extend from the first supporting electrode portion in a second direction crossing the first direction. The third branch electrode portion extends from the second branch electrode portion adjacent to the first branch electrode portion substantially parallel to the first branch electrode portion. The fourth branch electrode portion extends from the third branch electrode portion substantially parallel to the second branch electrode portion. The second pixel electrode includes a second supporting electrode portion, a fifth branch electrode portion and a sixth supporting electrode portion. The second supporting electrode portion faces the first supporting electrode portion. The fifth branch electrode portions extend from the second supporting electrode portion between the first branch electrode portion and the third branch electrode portion and between the first branch electrode portions. The sixth supporting electrode portions extend between the second supporting electrode portion and the fourth supporting electrode portions and between the second branch electrode portions.

Thus, in an array substrate and a display device having the array substrate according to an exemplary embodiment, an area for forming an angle of about 45 degrees between an alignment direction of liquid crystals and a polarization axis thereof are significantly increased to substantially enhance transmittance. Moreover, a driving voltage which forms a substantially horizontal electric field is significantly increased, and response time is thereby substantially enhanced. Therefore, a display quality of the display device including the array substrate is substantially enhanced.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
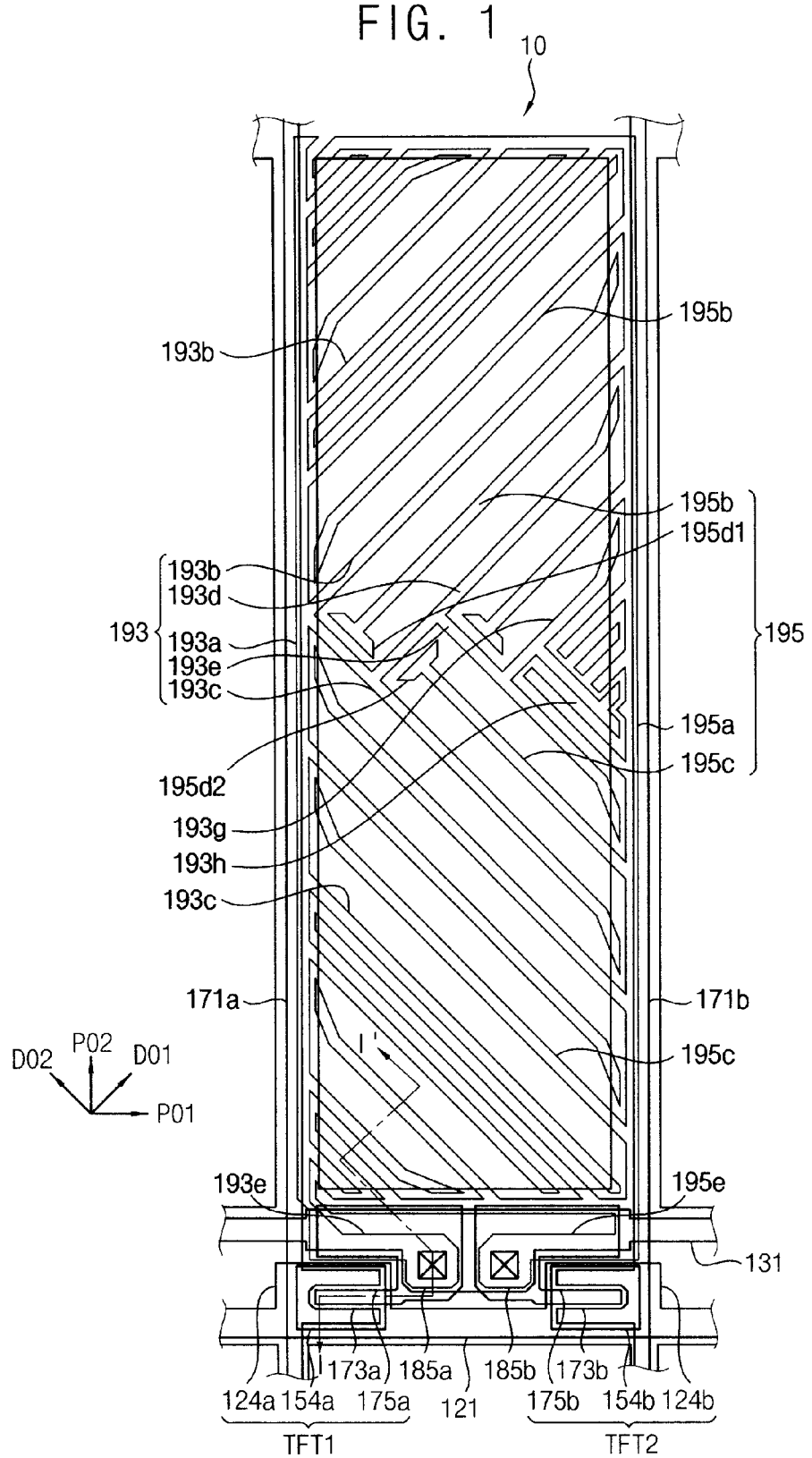
FIG. 1 is a plan view of an exemplary embodiment of a display device according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments will be described in further detail with reference to the accompanying drawings.

Figure 2:
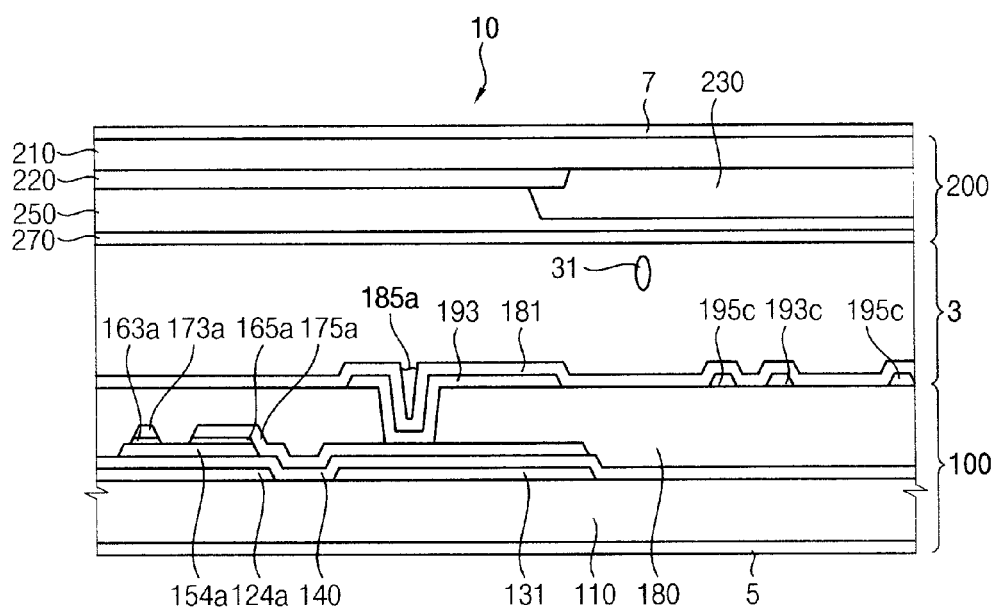
FIG. 2 is a partial cross-sectional view taken along line I-I' of FIG. 1.

FIG. 1 is a plan view of an exemplary embodiment of a display device 10 according to the present invention. FIG. 2 is a partial cross-sectional view taken along line I-I' of FIG. 1.

Referring to FIGS. 1 and 2, the display device 10 according to an exemplary embodiment includes an array substrate 100, an opposite substrate 200 and a liquid crystal layer 3 interposed between the array substrate 100 and the opposite substrate 200.

The array substrate 100 of an exemplary embodiment includes a lower substrate 110, a gate line 121, a storage line 131, a gate insulation layer 140, semiconductor layers 154a and 154b, ohmic contact layers 163a and 165a, a first data line 171a and a second data line 171b, an organic insulation layer 180, a first pixel electrode 193 and a second pixel electrode 195, and a lower alignment layer 181.

In an exemplary embodiment, any array substrate 100, including a micro-branch electrode portion array substrate 100, formed with a pixel electrode may be included as the array substrate 100 in an exemplary embodiment, but alternative exemplary embodiments are not limited thereto.

A gate metal layer (not fully shown) is deposited on the lower substrate 110, and the gate metal layer is etched to form a plurality of the gate lines 121 and a plurality of the storage lines 131. The lower substrate 110 may include glass and/or a plastic material having insulating properties. The gate line 121 may deliver a gate signal. The gate line 121 is disposed substantially parallel to a first side, e.g., a horizontal side, in a direction aligned with a first polarization axis direction P01 of a unit pixel area having the first side and an adjacent second side (a direction of being substantially perpendicular to the first polarization axis direction P01). The gate line 121 includes gate electrodes 124a and 124b extending therefrom. The gate electrodes 124a and 124b are disposed at two corner areas adjacent to a lower horizontal side of the unit pixel area, as shown in FIG. 1. In addition, the storage line 131 is disposed adjacent to the gate line 121 along the first polarization axis direction P01.

A gate insulation layer 140 is disposed on the gate lines 121 and the storage lines 131. In an exemplary embodiment, the gate insulation layer 140 may include silicon oxide (SiOx) or silicon nitride (SiNx), although alternative exemplary embodiments are not limited thereto.

A semiconductor layer, an ohmic contact layer and a source metal layer are sequentially disposed on the gate insulation layer 140, and the source metal layer, the ohmic contact layer and the semiconductor layer are etched to form a plurality of pairs of the first data line 171a and the second data line 171b, a plurality of the source electrodes 173a and 173b, island shape semiconductor layers 154a and 154b, island shape ohmic contact layers 163a and 165a, and drain electrodes 175a and 175b.

The island shape ohmic contact layers 163a and 165a and the drain electrodes 175a and 175b are disposed on the gate electrodes 124a and 124b. The semiconductor layer may include a material such as n+ hydrogenated amorphous silicon doped with n-type dopants such as phosphors (P) at a high concentration or, alternatively, silicide.

The first data line 171a and the second data line 171b deliver a data signal. The first data line 171a and the second data line 171b extend in a vertical side direction, e.g., along the second side of the unit pixel area, (hereinafter referred to as a "second polarization axis direction P02") of the unit pixel area, which crosses the first polarization axis direction P01, to cross the gate line 121 and the storage line 131. The first data line 171a and the second data line 171b according to an exemplary embodiment include a plurality of pairs of a first source electrode 173a and a second source electrode 173b each having a substantially U-shaped pattern that curves from the first data line 171a and the second data line 171b, respectively, along the first polarization axis direction P01.

In an exemplary embodiment, the gate lines 121 cross the first data line 171a and the second data line 171b to define a substantially rectangular area. Additionally, in an exemplary embodiment, the first pixel electrode 193 and the second pixel electrode 195 are disposed in the substantially rectangular area. Thus, the substantially rectangular area may be defined as the unit pixel area in an exemplary embodiment. Alternatively, a shape of the unit pixel area may be various shapes, such as a Z-shape or a V-shape, for example, but alternative exemplary embodiments are not limited thereto.

The gate electrodes 124a and 124b, the gate insulation layer 140, the island shape semiconductor layers 154a and 154b, the island shape ohmic contact layers 163a and 165a, the source electrodes 173a and 173b and the drain electrodes 175a and 175b form a first switching element TFT1 and a second switching element TFT2, respectively.

An organic insulation layer 180 covers at least a portion of the first data line 171a and the second data line 171b. Contact holes 185a and 185b expose a portion of the drain electrodes 175a and 175b through the organic insulation layer 180.

Figure 3:
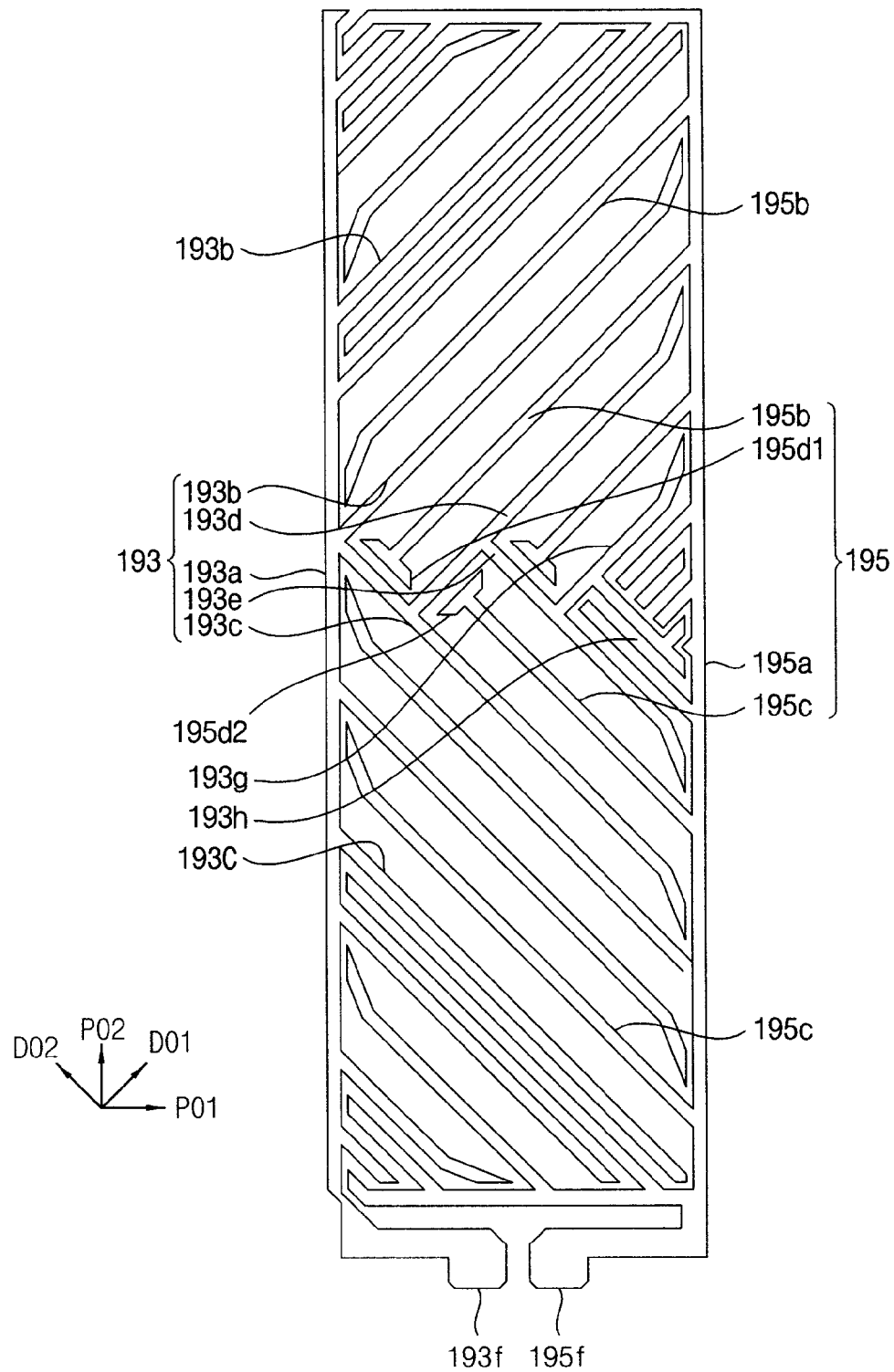
FIG. 3 is a plan view of an exemplary embodiment of a pixel electrode of the display device of FIG. 1.

FIG. 3 is a plan view of an exemplary embodiment of a pixel electrode of the display device of FIG. 1.

Referring to FIGS. 1, 2 and 3, an optically transparent and electrically conductive material layer such as indium tin oxide ("ITO") or indium zinc oxide ("IZO") is deposited on the organic insulation layer 180. The conductive material layer contacts the drain electrodes 175a and 175b through the contact holes 185a and 185b, respectively. The conductive material layer is etched to form the first pixel electrode 193 and the second pixel electrode 195 in the unit pixel area. The first pixel electrode 193 and the second pixel electrode 195 are the conductive material layer which remains after patterning, and define a plurality of domains in the unit pixel area, as will be described in further detail below.

The first pixel electrode 193 includes a first supporting electrode portion 193a, a plurality of first branch electrode portions 193b, a plurality of second branch electrode portions 193c, a plurality of third branch electrode portions 193d and a plurality of fourth branch electrode portions 193e.

The first supporting electrode portion 193a is disposed along a left-vertical side of the unit pixel area, e.g., the second side, and a first contact portion 193f is disposed at a lower portion of the first supporting electrode portion 193a, e.g., at the first side. The first contact portion 193f is electrically connected to the first drain electrode 175a through a first contact hole 185a. A gate signal is applied to the first gate electrode 124a through the gate line 121, and a first pixel voltage is applied to the first pixel electrode 193 through the first data line 171a.

The first branch electrode portions 193b extend from the first supporting electrode portion 193a along a first direction D01 to form an acute angle with a longitudinal axis of the first supporting electrode portion 193a. For example, as shown in the exemplary embodiment of FIG. 3, the first branch electrode portion 193b extends in an upper-right direction with respect to a central line dividing the unit pixel area and being substantially parallel to the first polarization axis direction P01. In an exemplary embodiment, the first direction D01 is inclined from the first polarization axis direction P01 and the second polarization axis direction P02 by about 45 degrees.

The second branch electrode portions 193c extend from the first supporting electrode portion 193a in a second direction D02 crossing the first direction D01. For example, the second branch electrode portion 193c extends in the upper-right direction with respect to the central line, as shown in FIG. 3. In an exemplary embodiment, the second direction D02 is substantially perpendicular to the first direction D01, and is inclined from the first polarization axis direction P01 and the second polarization axis direction P02 by about −45 degrees.

The first branch electrode portions 193b extend from an upper portion of the first supporting electrode portion 193a, while the second branch electrode portions 193c extend from a lower portion of the first supporting electrode portion 193a. Thus, a substantially V-shaped pattern is formed by the first branch electrode portions 193b and the second branch electrode portions 193c, and a substantially V-shaped is also formed by the third branch electrode portions 193d and the fourth branch electrode portions 193e.

The third branch electrode portion 193d may extend from the second branch electrode portion 193c substantially parallel to the first branch electrode portion 193b. The fourth branch electrode portion 193e may extend from the third branch electrode portion 193d substantially parallel to the second branch electrode portion 193c.

The first pixel electrode 193 may further include a seventh branch electrode portion 193g and an eighth branch electrode portion 193h, as shown in FIGS. 1 and 3. The seventh branch electrode portion 193g may be extend from the fourth branch electrode portion 193e substantially parallel to the third branch electrode portion 193d. The eighth branch electrode portion 193h may extend from the seventh branch electrode portion 193g substantially parallel to the fourth branch electrode portion 193e.

A type of connection in which the third, fourth, seventh and eighth branch electrode portions 193d, 193e, 193g and 193h, respectively, are connected to each other will hereinafter be referred to as a multi-branch type connection.

It will be noted that the first pixel electrode 193 according to an alternative exemplary embodiment may further include additional branch electrode portions connected to each other by the multi-branch type connection. Thus, the first pixel electrode 193 may have a substantially zigzag shape along the first polarization axis direction P01, as shown in FIGS. 1 and 3.

In an exemplary embodiment, the second pixel electrode 195 includes a second supporting electrode portion 195a, a fifth branch electrode portion 195b and a sixth branch electrode portion 195c.

The second supporting electrode portion 195a is disposed along a right-vertical side, an upper horizontal side and a lower horizontal side of the unit pixel area. A second contact portion 195f extends from a right corner portion of the second supporting electrode portion 195a. The second contact portion 195f is electrically connected to the second drain electrode 175b through a second contact hole 185b partially exposing the second drain electrode 175b. A gate signal is applied to the second gate electrode 124b through the gate line 121, and a second pixel voltage is applied to the second pixel electrode 195 through the second data line 171b.

Polarities of the first pixel voltage and the second pixel voltage are different from each other. A line structure, such as defined by the first data line 171a and the second data line 171b, limit maximum values of the first pixel voltage and the second pixel voltage. In an exemplary embodiment, the first pixel voltage and the second pixel voltage, having different polarities from each other, are applied to the first pixel electrode 193 and the second pixel electrode 195, respectively. Therefore, a voltage applied to the liquid crystal layer 3 is higher than a voltage applied to the liquid crystal layer 3 when the polarities of the first pixel voltage and the second pixel voltage are the same. Thus, a driving voltage, having a high level, is applied to the liquid crystal layer 3, and a response time of liquid crystals 31 of the liquid crystal layer 3 is substantially improved.

The fifth branch electrode portions 195b extend from the second supporting electrode portion 195a substantially parallel to the first branch electrode portions 193b. The fifth branch electrode portions 195b are disposed between the first branch electrode portion 193b and the third branch electrode portion 193d, as shown in FIG. 3. The sixth branch electrode portions 195c extend from the second supporting electrode portion 195a substantially parallel to the second branch electrode portion 193c and the fourth branch electrode portion 193e.

Thus, the unit pixel area according to an exemplary embodiment is divided into four domains by the abovementioned branch electrode portions. Specifically, an upper portion of the unit pixel area is divided into a first domain and a second domain by the first branch electrode portion 193b, the third branch electrode portion 193d and the fifth branch electrode portion 195b. A lower portion of the unit pixel area is divided into a third domain and a fourth domain by the second branch electrode portion 193c, the fourth branch electrode portion 193c and the sixth branch electrode portion 195c. An axis direction of the liquid crystals 31, such as a longitudinal axis direction, for example, of the liquid crystals 31 is disposed to be substantially perpendicular to the branch electrode portions. Thus, in the first and second domains, for example, the liquid crystals 31 are aligned in a substantially perpendicular direction with respect to the first direction D01. In the third and fourth domains, the liquid crystals 31 are aligned in a substantially perpendicular direction with respect to the second direction D02.

An interval distance between portions of the first pixel electrode 193 and the second pixel electrode 195 varies based on position in the unit pixel area. In an exemplary embodiment, for example, the third branch electrode portion 193d is spaced apart from the fifth branch electrode portion 195b by a first interval distance. The first branch electrode portion 193b, adjacent to the third branch electrode portion 193d, is spaced apart from the fifth branch electrode portion 195b by the first interval distance.

In an area adjacent to an upper-left corner portion of the unit pixel area (as viewed in FIGS. 1 and 3), the first branch electrode portion 193b is spaced apart from the fifth branch electrode portion 195b by a second interval distance. In an exemplary embodiment, the second interval distance is shorter than, e.g., is less than, the first interval distance. Thus, when an interval distance between the first branch electrode portion 193b and the second branch electrode portion 193c is decreased while respective pixel voltages, applied to the first branch electrode portion 193b and the second branch electrode portion 195b, are substantially equal, a strength of an electric field formed between the first branch electrode portion 193b and the second branch electrode portion 195b is increased. Thus, the left-upper corner area of the unit pixel area (FIGS. 1 and 3) is a high area, e.g., an area in which the electric field is relatively high with respect to another, different, area of the unit pixel area, while an area adjacent to the third branch electrode portion 193d is a low area, e.g., the different area in which the electric field is relatively low.

In addition, a lower portion of the unit pixel area in an exemplary embodiment has a symmetric structure about the central line of the unit pixel area with respect to the upper portion of the unit pixel area. Thus, the fourth slit portion 193e is spaced apart from the sixth branch electrode portion 195c by the first interval distance. Likewise, the second branch electrode portion 193c, adjacent to the fourth branch electrode portion 193e, is spaced apart from the sixth branch electrode portion 195c by the first interval distance. As a result, in an area adjacent to a left-lower corner portion of the unit pixel area, as viewed in FIGS. 1 and 3, the second branch electrode portion 193c is spaced apart from the sixth branch electrode portion 195c by the second interval distance.

The seventh branch electrode portion 193g is spaced apart from the fifth branch electrode portion 195b by the first interval distance. The eighth branch electrode portion 193h is spaced apart from the sixth branch electrode portion 195c by the second interval distance. Thus, an upper-left portion and a lower-right portion of the unit pixel area are sequentially divided into a high area, a low area, a high area, a low area and a high area, e.g., a first high area, a second high area and a third high area, with a first low area disposed between the first high area and the second high area, and a second low area disposed between the second high area and the third high area. Therefore, the first to fourth domains are divided into respective high areas and low areas, and the array substrate 100 according to an exemplary embodiment thereby includes eight domains. In an exemplary embodiment, for example, an interval distance between the abovementioned branch electrode portions may be from about 3 μm to about 24 μm, but alternative exemplary embodiments are not limited thereto.

Referring again to FIG. 2, the lower alignment layer 181 is disposed on the first pixel electrode 193 and the second pixel electrode 195. A lower polarizing plate 5 is disposed on a lower surface of the lower substrate 110, and has a first polarization axis substantially parallel to the first polarization axis direction P01 or, alternatively, substantially parallel to the second polarization axis direction P02.

The opposite substrate 200 may include an upper substrate 210, a light-blocking pattern 220, a color filter pattern 230, an overcoating layer 250 and an upper alignment layer 270.

The light-blocking pattern 220 is disposed on the upper substrate 210 corresponding to the gate line 121, the first data line 171a and the second data line 171b, the first switching element TFT1 and the second switching element TFT2 and the storage line 131. Thus, the color filter pattern 230 is disposed on the upper substrate 210 corresponding to the unit pixel area which is not blocked by the light-blocking pattern 220. The color filter pattern 230 may include, for example, a red filter, a green filter and a blue filter. The red filter, the green filter and the blue filter may be disposed in the unit pixel area along the first polarization axis direction P01.

The overcoating layer 250 coverts the color filter pattern 230 and the light-blocking pattern 220. The upper alignment layer 270 may be disposed on the overcoating layer 250. A material of the upper alignment layer 270 may substantially the same as a material of the lower alignment layer 181. In an exemplary embodiment, the liquid crystal layer 3 may include nematic liquid crystals 31. In addition, the lower alignment layer 181 and the upper alignment layer 270 are not rubbed, and may instead be aligned by a process which vertically aligns the nematic liquid crystals 31.

In an exemplary embodiment, a substantially horizontal electric field is formed between the first pixel electrode 193 and the second pixel electrode 195. In addition, the opposite substrate 200 in an exemplary embodiment does not include an electrode for forming an electric field to be generated in the liquid crystals 31, e.g., the opposite substrate 200 does not include a common electrode (not shown), but alternative exemplary embodiments are neither limited nor restricted thereto. An upper polarizing plate 7 may be disposed on an upper surface of the opposite substrate 200, as shown in FIG. 2. The upper polarizing plate 7 may have the second polarization axis substantially perpendicular to the first polarization axis of the lower polarizing plate 5, described in further detail above.

Figure 4:
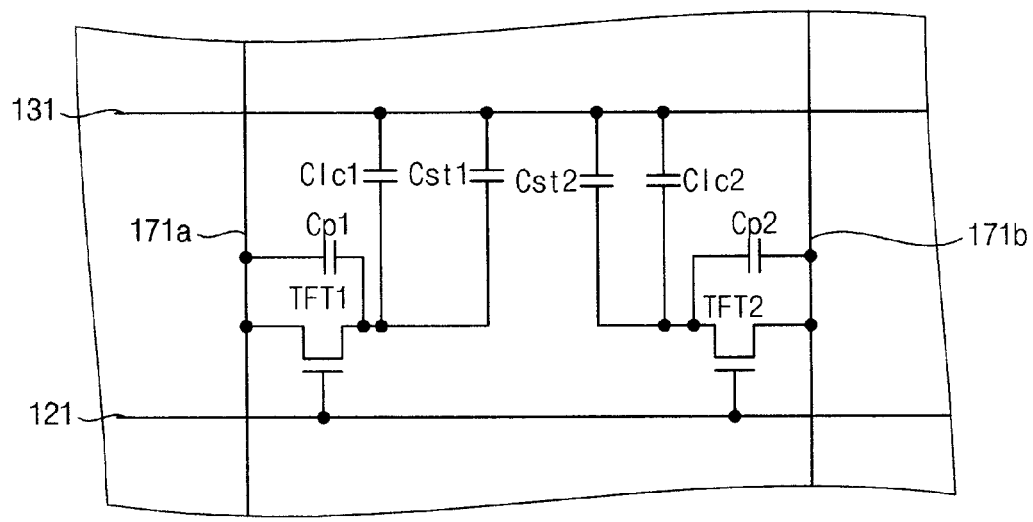
FIG. 4 is an equivalent schematic circuit diagram of the display device of FIG. 1.
Figure 5A:
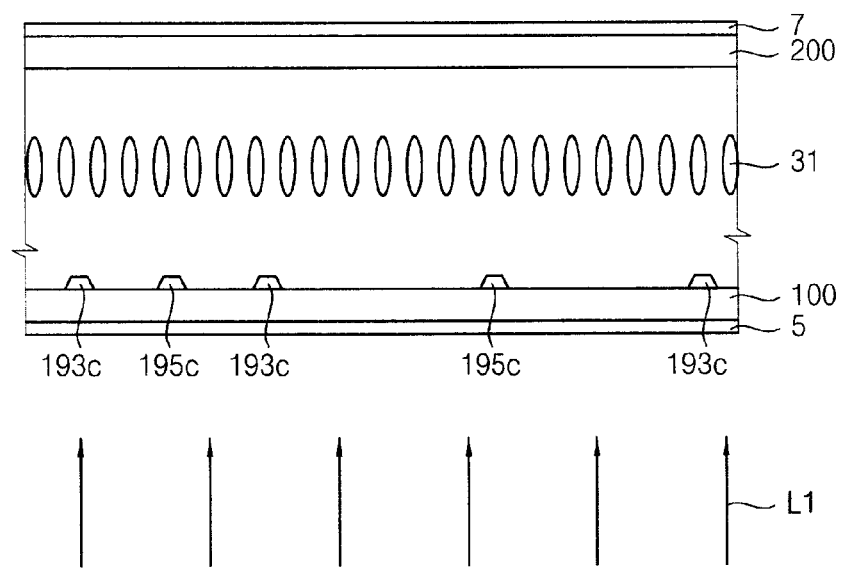
FIGS. 5A and 5B are partial cross-sectional views illustrating an exemplary embodiment of a driving state of the display device of FIG. 1.
Figure 5B:
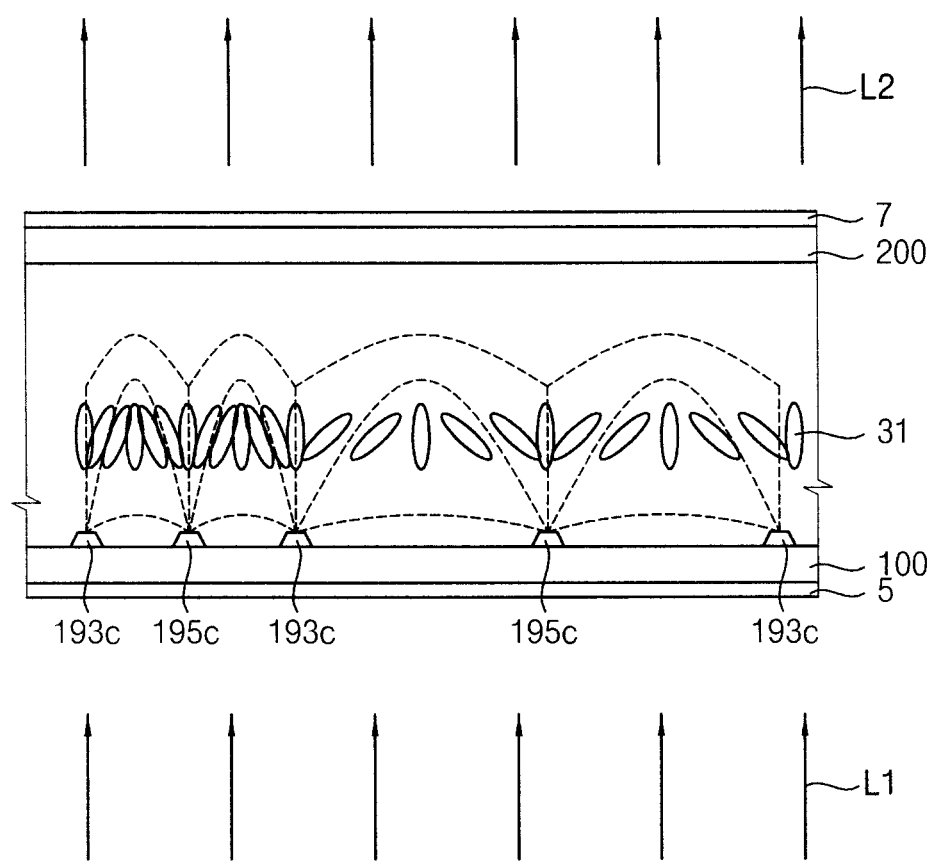

FIG. 4 is an equivalent schematic circuit diagram of the display device 10 of FIG. 1. FIGS. 5A and 5B are partial cross-sectional views illustrating an exemplary embodiment of driving states of the display device 10 of FIG. 1.

Referring to FIG. 4, the first pixel voltage and the second pixel voltage having different polarities are applied to the first pixel electrode 193 and the second pixel electrode 195, respectively, through the first switching element TFT1 and the second switching element TFT2, respectively. The first pixel voltage and the second pixel voltage may be applied to the first pixel electrode 193 and the second pixel electrode 195 for a single frame by a first storage capacitor Cst1 and a second storage capacitor Cst2. The first storage capacitor Cst1 and the second storage capacitor Cst2 are disposed between the storage line 131 and the first pixel electrode 193, e.g., a first liquid crystal capacitor Clc1, and the storage line 131 and the second pixel electrode 195, e.g., a second liquid crystal capacitor Clc2, respectively. A first parasitic capacitor Cp1 and a second parasitic capacitor Cp2 may be disposed between the first data line 171a and the second data line 171b, respectively, and the first pixel electrode 193 and the second pixel electrode 195, respectively.

Referring to FIG. 5A, when the display device 10 according to an exemplary embodiment is driven in an off-mode, e.g., a mode in which a pixel voltage is not applied to the first pixel electrode 193 or the second pixel electrode 195, the longitudinal axis of the liquid crystals 31 is aligned substantially along a vertical direction substantially perpendicular to a plane defined by a surface of the array substrate 100. Thus, light L1 from a backlight (not shown) incident on a rear, e.g., lower, surface of the array substrate 100 is blocked due to orthogonal polarization associated with the lower polarizing plate 5 and the upper polarizing plate 7, so that the display device 10 displays a black mode.

Referring to FIG. 5B, when the display device 10 is driven in an on-mode, e.g., a mode in which the first pixel voltage and the second pixel voltage are applied to the first pixel electrode 193 and the second pixel electrode 195, respectively, a horizontal electric field, illustrated by dashed lines in FIG. 5B, is formed between the first pixel electrode 193 and the second pixel electrode 195. The liquid crystals 31, which are a positive type in an exemplary embodiment, as shown in FIG. 5B, are thereby aligned such that the longitudinal axis of the liquid crystals 31 is aligned substantially parallel to the electric field. Thus, the liquid crystals 31 are inclined along the electric field, and inclinations of the liquid crystals 31 in the high area and the low area are different from each other, due to the differing strengths of the electric field in the high areas and low areas, as described in greater detail above. Thus, a transmittance may be different for the high area in comparison with the low area. Thus, at a low gray scale, a luminance of the unit pixel area is substantially provided from the high area, while at a middle or a high gray scale, the luminance of the unit pixel area is obtained not only from the high area but also from the low area. The light L1 from the backlight (not shown), incident on the rear surface of the array substrate 100, is polarized by the lower polarizing plate 5, and undergoes double refraction through the liquid crystals 31, so that the polarization state of the light L1 is changed and light L2 thereby passes through the upper polarizing plate 7 according to an alignment of the liquid crystals 31. Therefore, the display device 10 displays a white mode.

In the an exemplary embodiment, as described in further detail above, the first pixel voltage and the second pixel voltage, having different polarities from each other, are applied to the first pixel electrode 193 and the second pixel electrode 195, respectively. Thus, a driving voltage having a high level is applied to the liquid crystal layer 3, and textures generated at a side of the unit pixel area are substantially decreased or effectively eliminated. In addition, the low area and the high area are formed in accordance with gaps between the first branch electrode portion 193b and the second branch electrode portion 193c, and a number of domains in the display device 10 according to an exemplary embodiment is substantially improved, e.g., is increased from 4 to 8. Thus, side visibility of the display device 10 is significantly improved.

Figure 6:
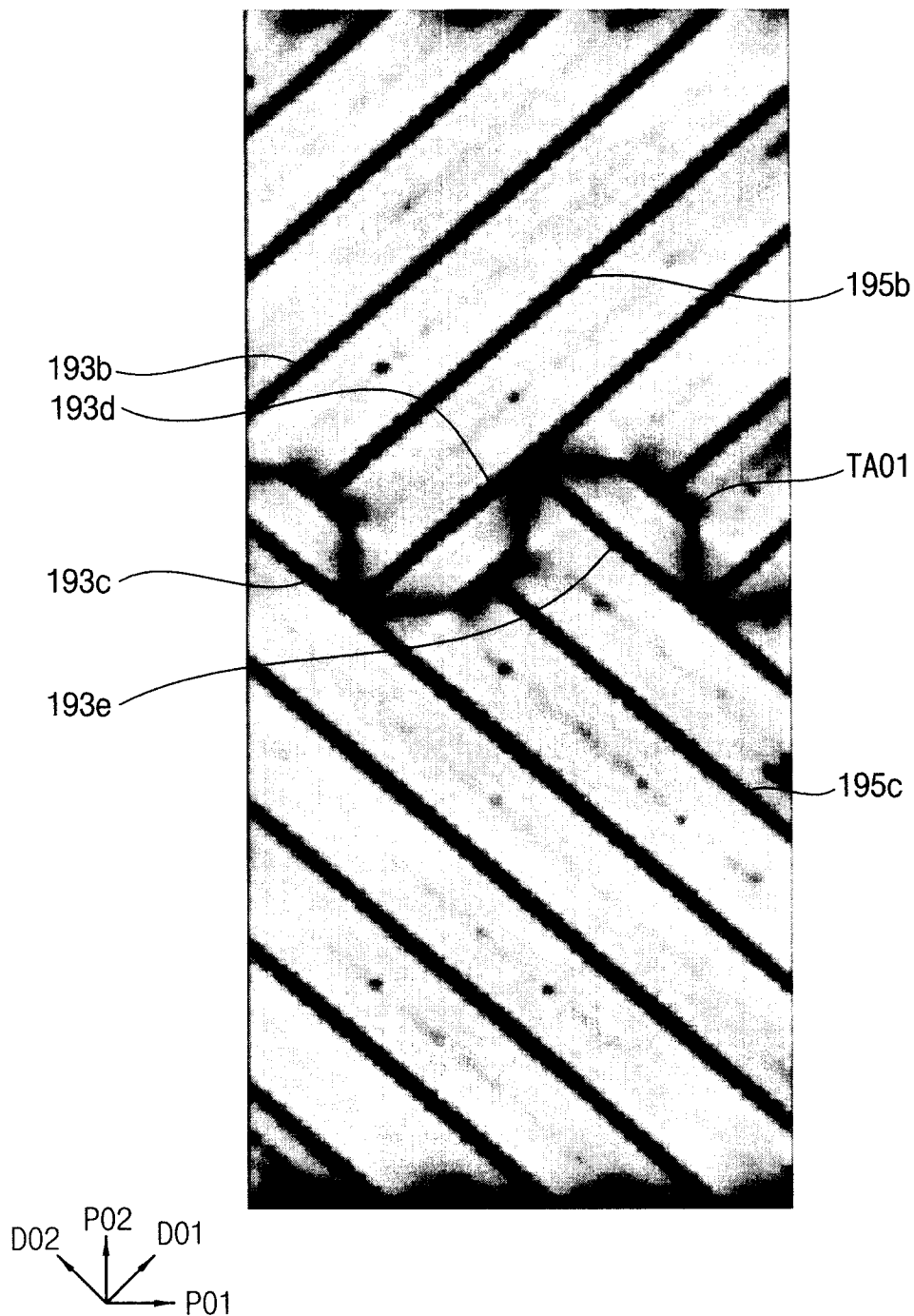
FIG. 6 is a plan view of the display device of FIG. 1 illustrating a texture generated therein.

FIG. 6 is a plan view of the display device 10 of FIG. 1 illustrating a texture generated therein.

Referring to FIG. 6, in a center area of the unit pixel area, a boundary area between upper domains and lower domains, e.g., a boundary area in which the first domains and the second domains, and the third domains and the fourth domains, respectively, meet with each other, has a substantially zigzag shape, e.g., not a straight shape, as described above.

Moreover, when the longitudinal axis of the liquid crystals 31 crosses a polarization axis by about 45 degrees, a light-use efficiency of the display device 10 may be at a maximum. Thus, in an exemplary embodiment having the substantially zigzag shape, the third branch electrode portion 193d and the fourth branch electrode portion 193e cross the first polarization axis direction P01 and the second polarization axis direction P02 by about 45 degrees. Since the longitudinal axis of the liquid crystals 31, substantially perpendicular to the third branch electrode portion 193d and the fourth branch electrode portion 193e, and the longitudinal axis of the liquid crystals 31 is disposed to cross the first polarization axis and the second polarization axis by about 45 degrees, generation of a texture TA01 is decreased in the unit pixel area, as shown in FIG. 6.

Referring again to FIG. 3, the second pixel electrode 195 according to an exemplary embodiment further includes a first head portion 195d1 and a second head portion 195d2. The first head portion 195d1 extends from an end portion of the fifth branch electrode portion 195b substantially parallel to the second branch electrode portion 193c. The second head portion 195d2 extends from an end portion of the sixth branch electrode portion 195c substantially parallel to the third branch electrode portion 193d. Each of the first head portion 195d1 and the second head portion 195d2 is spaced apart from an adjacent branch electrode portions, for example, the second branch electrode portion 193c, the third branch electrode portions 193d and the fourth branch electrode portion 193e by the second interval distance. The first head portion 195d1 and the second head portion 195d2 prevent effectiveness of control of the liquid crystals 31 from being decreased at end portions of the fifth branch electrode portion 195b and the sixth branch electrode portion 195c. Thus, as shown in FIG. 6, generation of the texture TA01 is substantially decreased at a boundary area of the zigzag shape in the upper and lower domains.

Figure 7:
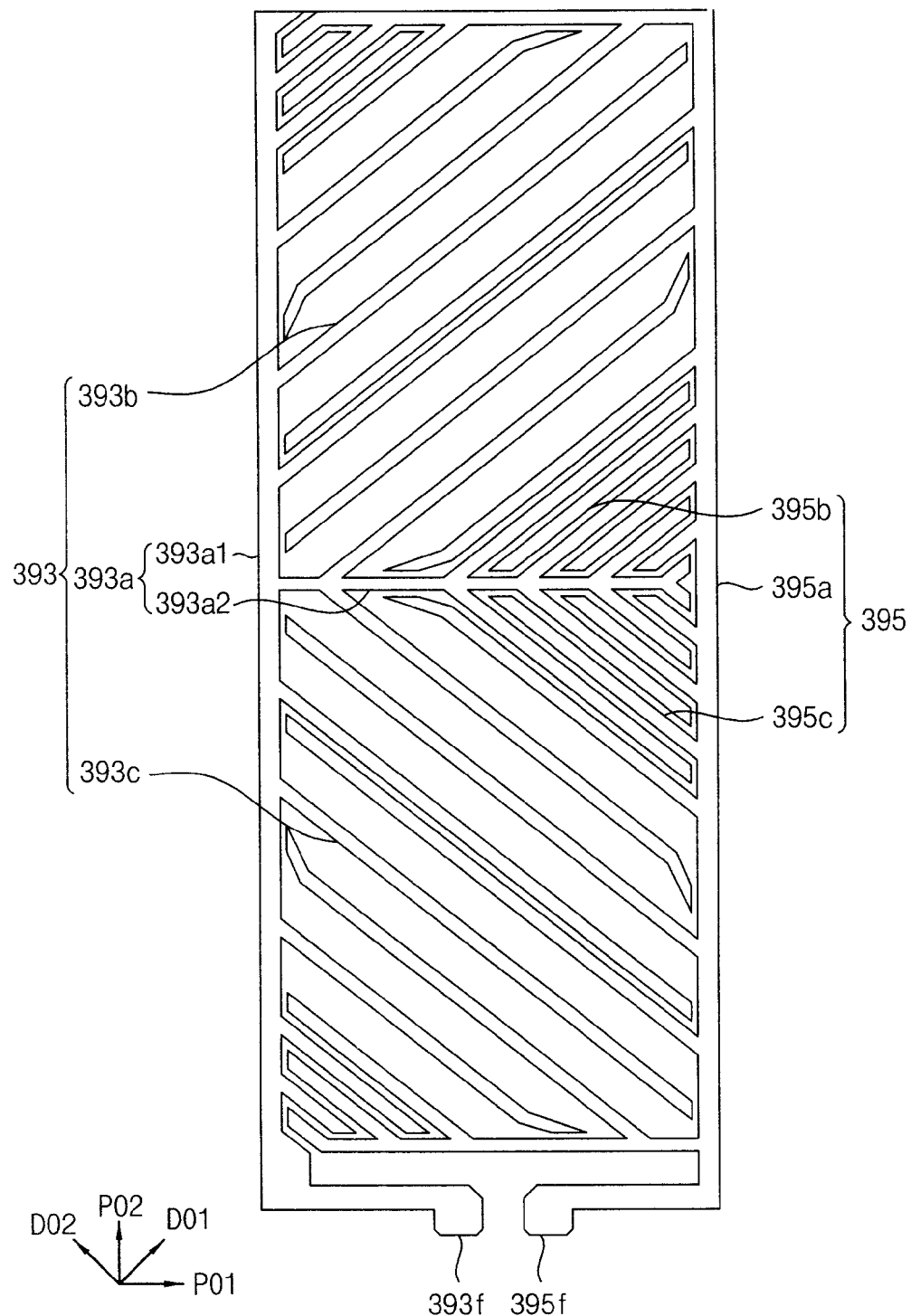
FIG. 7 is a plan view of a pixel of an acute-angle type array substrate.

FIG. 7 is a plan view of a pixel of an acute-angle type array substrate.

The array substrate shown in FIG. 7 differs from the array substrate 100 according to an exemplary embodiment described in greater detail above with reference to FIGS. 1 through 3 in at least several ways, but not being limited thereto, as will now be described in further detail with reference to FIG. 7.

The array substrate shown in FIG. 7 is an acute-angle type array substrate. In the acute-angle type array substrate, a first supporting electrode portion 393a of a first pixel electrode 393 (also having a contact portion 393f extending therefrom) extends along a left-vertical side of a unit pixel area and a central line along a first polarization axis direction P01.

However, in contrast and in accordance with exemplary embodiments as described herein, the branch electrode portions of the array substrate shown in FIG. 7 are not disposed in a multi-branch type manner in the first pixel electrode 393, such that a boundary area between an upper domain and a lower domain of the unit pixel area does not a zigzag shape, e.g., a straight type boundary is instead formed between the upper domain and the lower domain, as shown in FIG. 7. As a result, a first portion 393a1 of the first supporting electrode portion 393a which extends along the central line crosses a first branch electrode portion 393b and a second branch electrode portion 393c of the first pixel electrode 393, as well as a third branch electrode portion 395b and a fourth branch electrode portion 395c of a second pixel electrode 395 (also having a second supporting electrode portion 395a and second contact portion 395f), by an acute angle.

As a result, a longitudinal axis of liquid crystals (not shown) adjacent to a second portion 393a2 extending along the central line and the first polarization axis direction P01 or, alternatively, along the second polarization axis P02, do not form an angle of about 45 degrees, as is the case in an exemplary embodiment of the present invention. As a result, substantial textures are generated adjacent to the second portion 393a2, and a transmittance is therefore substantially decreased.

On the other hand, in the array substrate 100 and the display device 10 according to an exemplary embodiment, the first pixel electrode 193 includes the branched branch electrode portions, described above in greater detail, as well as the first head portion 195d1 and the second head portion 195d2 disposed at end portions of the fifth branch electrode portion 195b and the sixth branch electrode portion 195c. Accordingly, generation of textures in the display device 10 according to an exemplary embodiment is substantially decreased and/or effectively eliminated.

Figure 8:
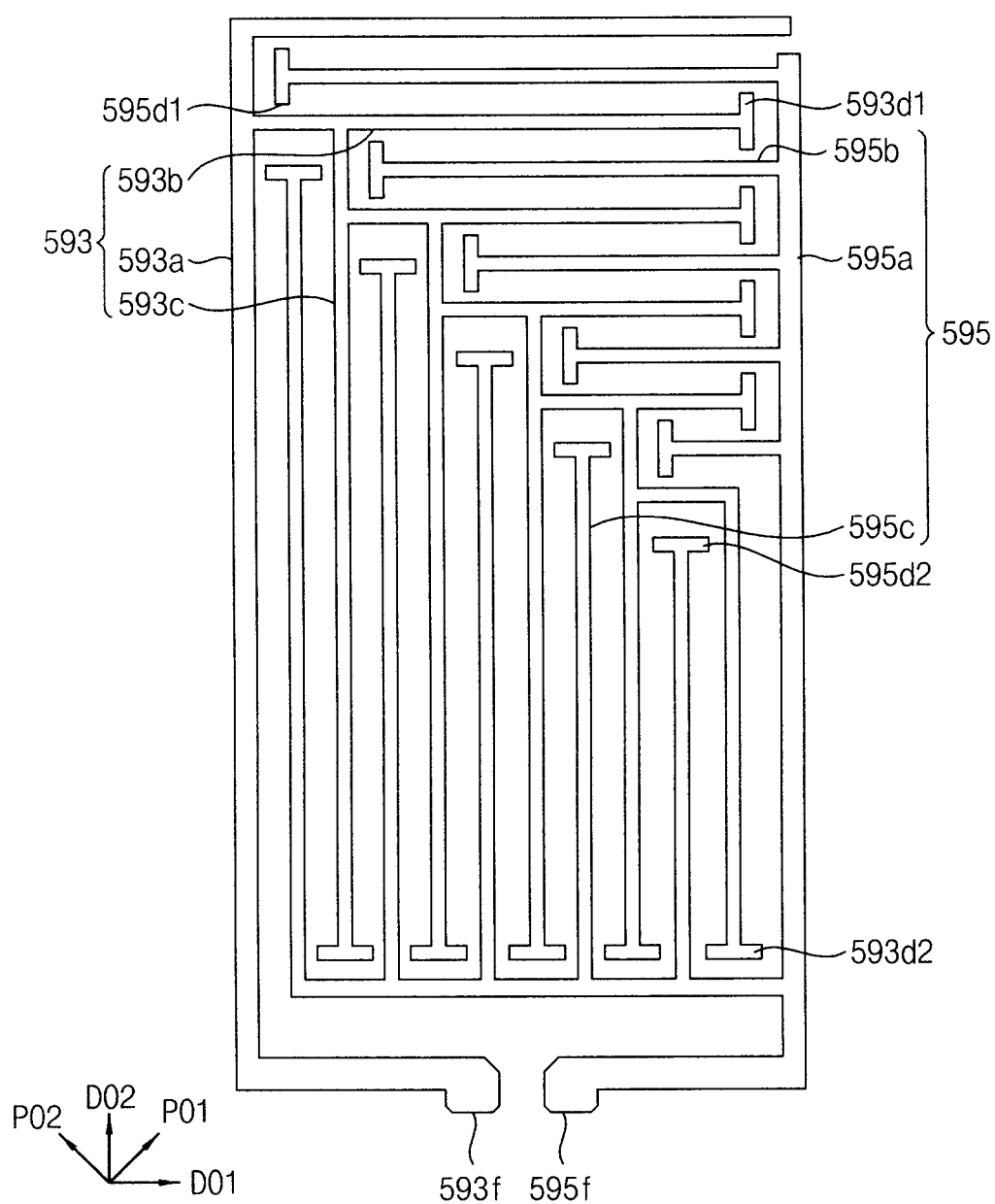
FIG. 8 is a plan view of an alternative exemplary embodiment of a pixel electrode of an alternative exemplary embodiment of an array substrate according to the present invention.

FIG. 8 is a plan view of an alternative exemplary embodiment of a pixel electrode of an array substrate according to the present invention.

Referring to FIG. 8, an array substrate according to an exemplary embodiment is substantially the same as the array substrate 100 described in greater detail above with reference to FIGS. 1 through 3, except for the shape of a pixel electrode and a direction in which the pixel electrode is disposed, as will hereinafter be described in further detail; thus, any repetitive detailed description thereof will be omitted.

Referring now to FIG. 8, the array substrate according to an exemplary embodiment includes a first pixel electrode 593 and a second pixel electrode 595. The first pixel electrode 593 and the second pixel electrode 595 are disposed in a unit pixel area having a substantially rectangular shape including a first side, e.g., a latitudinal or horizontal side, and a second side, e.g., a longitudinal or vertical side. A horizontal electric field is formed between the first pixel electrode 593 and the second pixel electrode 595.

The first pixel electrode 593 includes a first supporting electrode portion 593a, first branch electrode portions 593b and second branch electrode portions 593c.

The first supporting electrode portion 593a is disposed along a left-vertical side and an upper horizontal side of the unit pixel area (as viewed in FIG. 8). A first contact portion 593f extends from the first supporting electrode portion 593a from a lower portion of the first supporting electrode portion 593a. The first branch electrode portions 593b are arranged in a first area of the unit pixel area along a first direction D01 substantially parallel to the horizontal side (note that the directions illustrated in FIG. 8 are rotated 45 degrees with respect to the directions shown in FIGS. 1, 3, 6 and 7). At least one of the first branch electrode portions 593b extends from the first supporting electrode portion 593a.

The second branch electrode portions 593c are arranged in a second area of the unit pixel area in a second direction D02 substantially perpendicular to the first direction D01. More specifically, an n-th second branch electrode portion 593c (where "n" is a natural number) and an (n+1)-th second branch electrode portion 593c are extended from an m-th first branch electrode portion 593b (where "m" is a natural number) and an (m+1)-th first branch electrode portion 593b, while the (m+1)-th first branch electrode portion 593b extends from the n-th second branch electrode portion 593c. Thus, as shown in FIG. 8, the first pixel electrode 593 according to an exemplary embodiment has a substantially rectilinear shape in portions thereof.

The first pixel electrode 593 further includes a first head portion 593d1 and a second head portion 593d2. The first head portion 593d1 and the second head portion 593d2 extend from the first branch electrode portion 593b and the second branch electrode portion 593c, respectively, in the second direction D02 and the first direction D01, respectively. The first head portion 593d1 and the second head portion 593d2 substantially decrease a generation of a texture at a boundary area of the unit pixel area, as described in further detail above with reference to the exemplary embodiments shown in FIGS. 1 through 6.

The second pixel electrode 595 includes a second supporting electrode portion 595a, third branch electrode portions 595b and fourth branch electrode portions 595c.

The second supporting electrode portion 595a is disposed along a right-vertical side and a lower horizontal side of the unit pixel area (as viewed in FIG. 8). A second contact portion 595f extends from a lower-right corner portion of the second supporting electrode portion 595a. The third branch electrode portion 595b extends from the second supporting electrode portion 595a between the first branch electrode portions 593b substantially parallel to the first branch electrode portions 593b. The fourth branch electrode portion 595c extends from the second supporting electrode portion 595a between the second branch electrode portions 593c substantially parallel to the second branch electrode portion 593c.

The second pixel electrode 595 further includes a third head portion 595d1 and a fourth head portion 595d2. The third head portion 595d1 and the fourth head portion 595d2 extend from end portions of the third branch electrode portion 595b and the fourth branch electrode portion 595c, respectively, substantially parallel to the second branch electrode portion 593c and the first branch electrode portion 593b, respectively.

The third head portion 595d1 and the fourth head portion 595d2 substantially reduce and/or effectively prevent a decrease in control of liquid crystals 31 (FIG. 2) at end portions of the third branch electrode portion 595b and the fourth branch electrode portion 595c, as described in greater detail above with reference to the exemplary embodiments shown in FIGS. 1 through 6.

In an exemplary embodiment, the first branch electrode portion 593b is spaced apart from the third branch electrode portion 595b by a first interval distance. The first branch electrode portion 593b and the third branch electrode portion 595b form two domains. The second branch electrode portion 593c is spaced apart from the fourth branch electrode portion 595c by the first interval distance. The second branch electrode portion 593c and the fourth branch electrode portion 585c form two domains that are different from the two domains formed by the first branch electrode portion 593b and the third branch electrode portion 595b.

Thus, as shown in FIG. 8, an alternative exemplary embodiment of a display device is substantially the same as the exemplary embodiments of the display device 10 described in greater detail above with reference to FIGS. 1 through 6, except that the array substrate (FIG. 8) is included in the display device according to the alternative exemplary embodiment, and the first polarization axis direction P01 and the second polarization axis direction P02 of the polarization plate are inclined from an extending direction of the first branch electrode portion 593b and the second branch electrode portion 593c by about 45 degrees. Thus, any repetitive detailed description of the abovementioned alternative exemplary embodiments will hereinafter be omitted.

In an exemplary embodiment, a first polarization axis of a lower polarization plate (FIG. 2) is substantially parallel to the first polarization axis direction P01 that crosses a first direction D01 by about 45 degrees, as shown in FIG. 8. A second polarization axis of an upper polarization plate (FIG. 2) is disposed substantially parallel to the second polarization axis direction P02 substantially perpendicular to the first polarization axis. Thus, the first pixel electrode 593 and the second pixel electrode 595 are disposed to cross the first polarization axis and the second polarization axis by about 45 degrees in all portions of the unit pixel area.

A longitudinal axis of liquid crystals (FIG. 2) is disposed substantially perpendicular to the first supporting electrode portion 593a, the second supporting electrode portion 595a, and the first through fourth branch electrode portions 593b, 593c, 595b and 595c, respectively. Thus, when an electric field is applied thereto, the longitudinal axis of the liquid crystals is arranged to form an angle of about 45 degrees with respect to the first polarization axis and the second polarization axis. Therefore, a light-use efficiency of the display device according to an exemplary embodiment is substantially enhanced, and transmittance is substantially increased, due to substantially decreasing textures therein, and a display quality is thereby significantly improved.

Figure 9A:
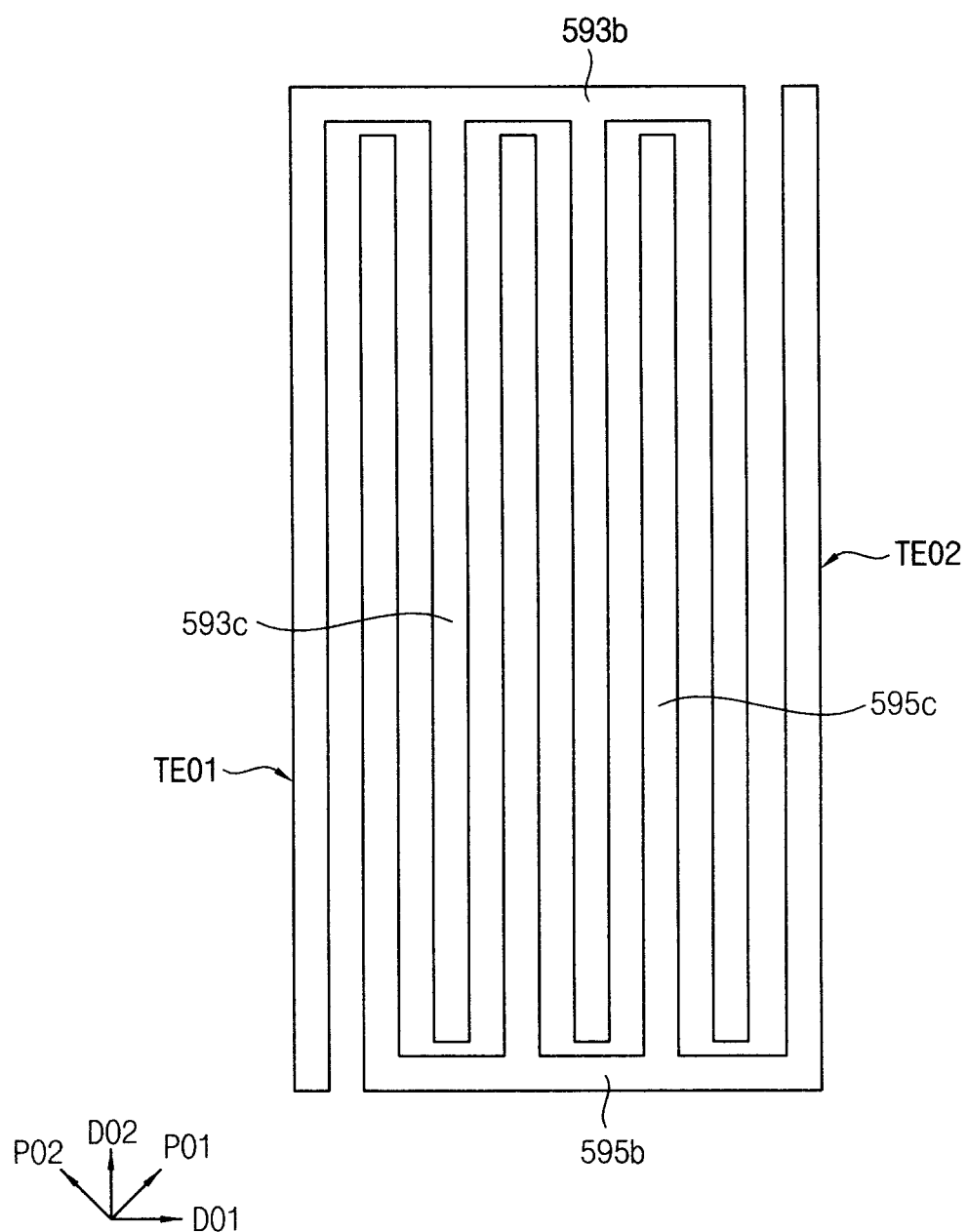
FIG. 9A is a plan view of an exemplary embodiment of a test electrode modeled after the pixel electrode of FIG. 8.
Figure 9B:
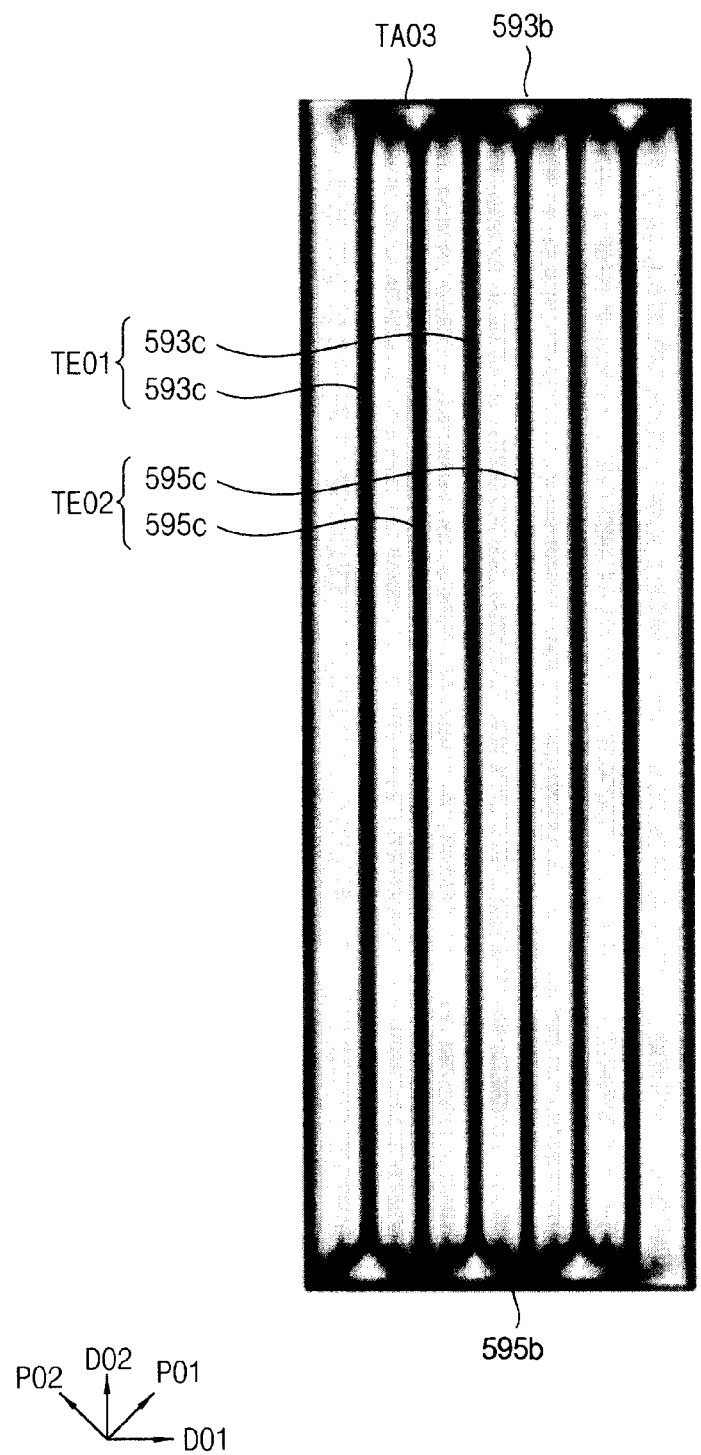
FIG. 9B is a photograph of the test electrode of FIG. 9A showing a texture generated therein.

FIG. 9A is a plan view of an exemplary embodiment of a test electrode modeled after the exemplary embodiment of the pixel electrode shown in FIG. 8. FIG. 9B is a photograph of the test electrode of FIG. 9A showing a texture generated therein.

As shown in FIG. 9A, a first test electrode TE01 includes a first branch electrode portion 593b substantially parallel to a horizontal side of a rectangular cell, and a second branch electrode portion 593c substantially parallel to a vertical side of the rectangular cell. A second test electrode TE02 includes a third branch electrode portion 595b facing the first branch electrode portion 593b and fourth branch electrode portions 595c disposed between the second branch electrode portions 593c. Thus, a polarization axis having an angle of about 45 degrees with respect to the first supporting electrode portion 593a and the second branch electrode portion 593c is formed. Accordingly, the first test electrode TE01 and the second test electrode TE02 were used as a model for the first pixel electrode 593 and the second pixel electrode 595 according to the exemplary embodiments described in greater detail above with reference to FIG. 8.

As a result of a simulation performed by applying an electric field to the first test electrode TE01 and the second test electrode TE02, in a display device according to an exemplary embodiment, it can be seen from FIG. 9B that a texture is almost completely prevented from being generated at the second branch electrode portion 593c and the fourth branch electrode portion 595c, and a texture TA03 is only very slightly generated at end portions of the fourth branch electrode portion 595c and the second branch electrode portion 593c. In addition, in an exemplary embodiment described above with reference to FIG. 8, head portions are disposed at end portions of the first through fourth branch electrode portions 593b, 593c, 595b and 595c, respectively, as shown in FIG. 8, so that the textures are even further substantially reduced in an exemplary embodiment as compared to the first test electrode TE01 and the second test electrode TE02 shown in FIG. 9B (which do not include models of the head portions).

Figure 10:
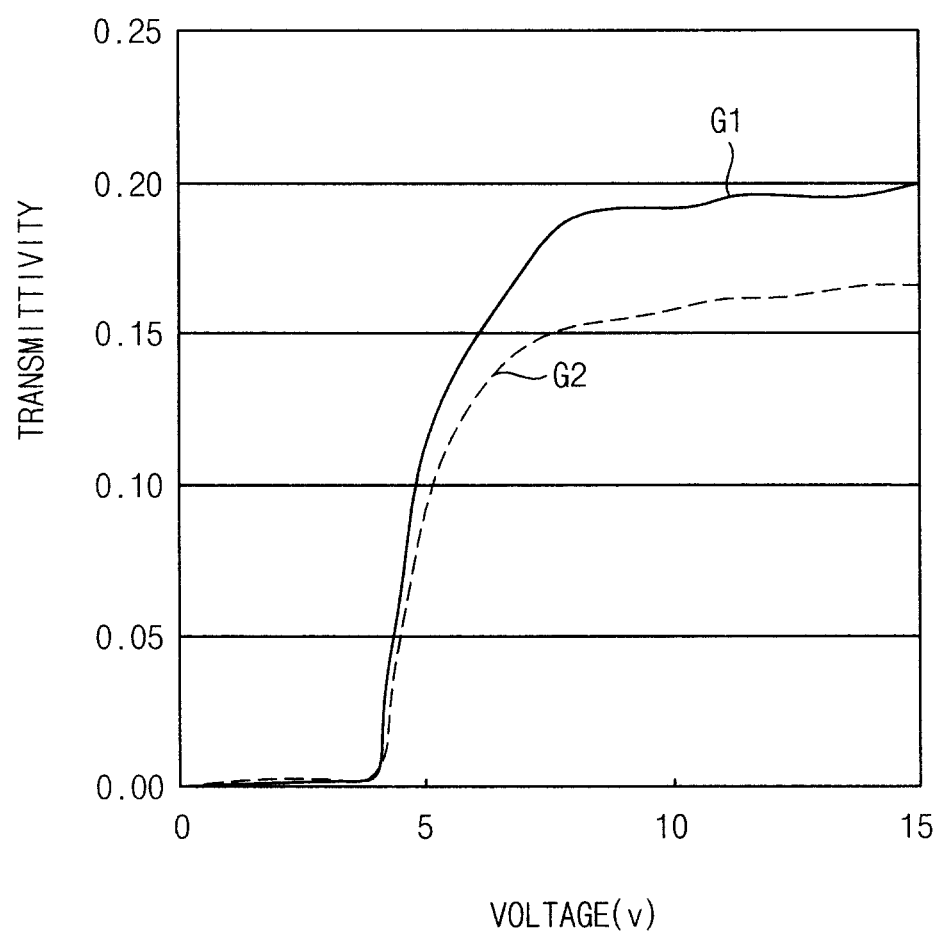
FIG. 10 is a graph of transmittance versus voltage illustrating characteristics of the display devices of FIGS. 7 and 8.

FIG. 10 is a graph of transmittance versus voltage illustrating characteristics of the display devices of FIGS. 7 and 8. In FIG. 10, a horizontal axis represents a voltage applied to a liquid crystal layer, and a vertical axis represents a transmittance of a display device. Curve G1 represents a simulation result of the display device 10 according to an exemplary embodiment described above with reference to FIG. 8, and curve G2 represents a simulation result of a display device described above with reference to FIG. 7.

Referring to FIG. 10, as can be seen from curve G1, which represents a display device according to an exemplary embodiment, transmittance approaches about 0% when a voltage is no more than about 4 volts ("V,"), and transmittance rapidly increases when the voltage is in a range from about 4 V to about 8 V. Moreover, transmittance is in about 20% when the voltage is in a range from about 8 V to about 15 V. In contrast and as shown in curve G2, representing a display device, it can be seen that transmittance is approached to about 0% when a voltage is no more 4 V, transmittance is rapidly increases when a voltage is in a range from about 4 V to about 8 V, and transmittance is only about 16% to about 17% when the voltage is in a range of about 8 V to about 15 V.

Thus, it can be seen that an array substrate and a display device having the array substrate according to an exemplary embodiment has significantly improved transmittance characteristics over the acute-angle type display device described above with reference to FIG. 7.

FIGS. 11 through 14 are plan views of alternative exemplary embodiments of pixel electrodes according to the present invention.

Figure 11:
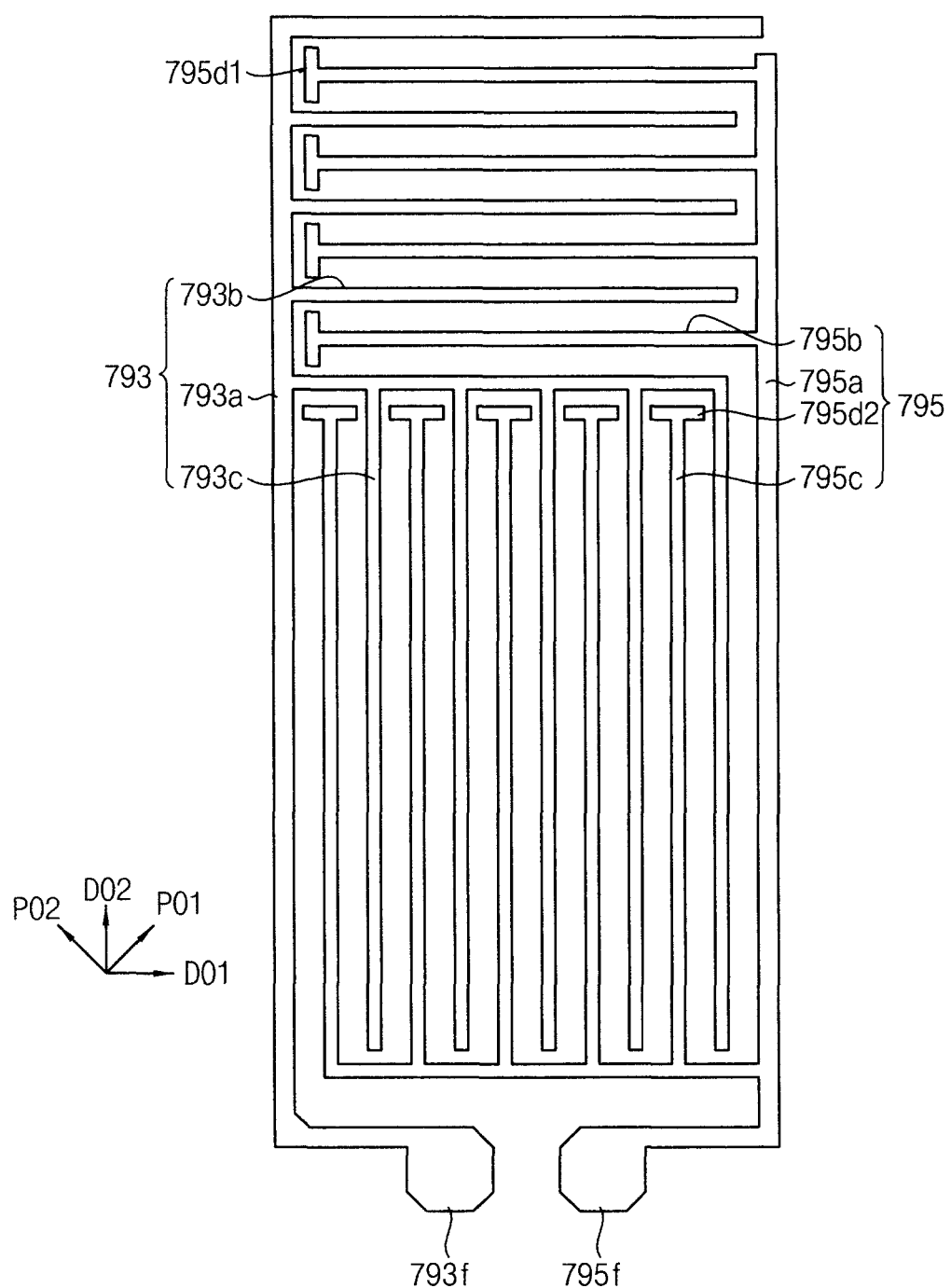
FIGS. 11 through 14 are plan views of alternative exemplary embodiments of a pixel electrode according to the present invention.

In an array substrate according to an alternative exemplary embodiment shown in FIG. 11, a first branch electrode portion 793b of a first pixel electrode 793 and a second branch electrode portion 793c thereof are not connected to each other in a multi-branch type (described in greater detail above), and the second branch electrode portions 793c extend from one of the first branch electrode portion 793b, while another first branch electrode portion 793b extends from a first supporting electrode portion 793a. In addition, the first pixel electrode 793 includes a first contact portion 793f, as shown in FIG. 11. Additionally, a second pixel electrode 795 includes a second supporting pixel portion 795a, a third branch electrode portion 795b, a fourth branch electrode portion 795c, a first head portion 795d1 and a second head portion 795d2, and second contact portion 795f, as shown in FIG. 11.

Figure 12:
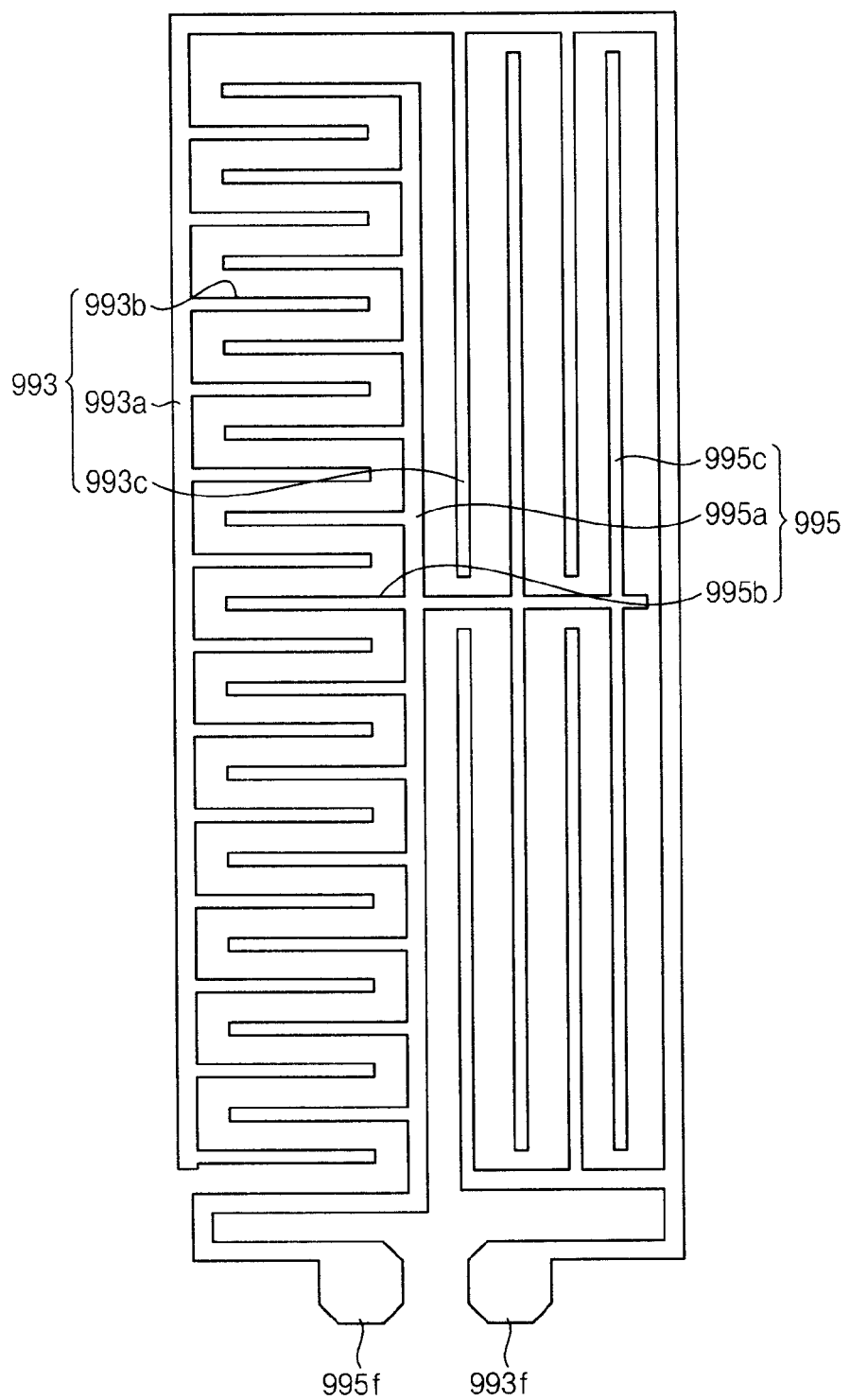

In an array substrate according to an alternative exemplary embodiment shown in FIG. 12, a first supporting electrode portion 993a is disposed to substantially surround a periphery of a unit pixel area, and a first branch electrode portion 993b and a second branch electrode portion 993c extend from a first supporting electrode portion 993a of a first pixel electrode 993 (also including a first contact portion 993f). Likewise, a second pixel electrode 995 includes a second supporting electrode portion 995a having a substantially cross shape disposed at a center portion of the unit pixel area to divide the unit pixel area into a plurality of domains. The second pixel electrode 995 further includes a third branch electrode portion 995b, a fourth branch electrode portion 995c, and a second contact portion 993f, as shown in FIG. 12

Figure 13:
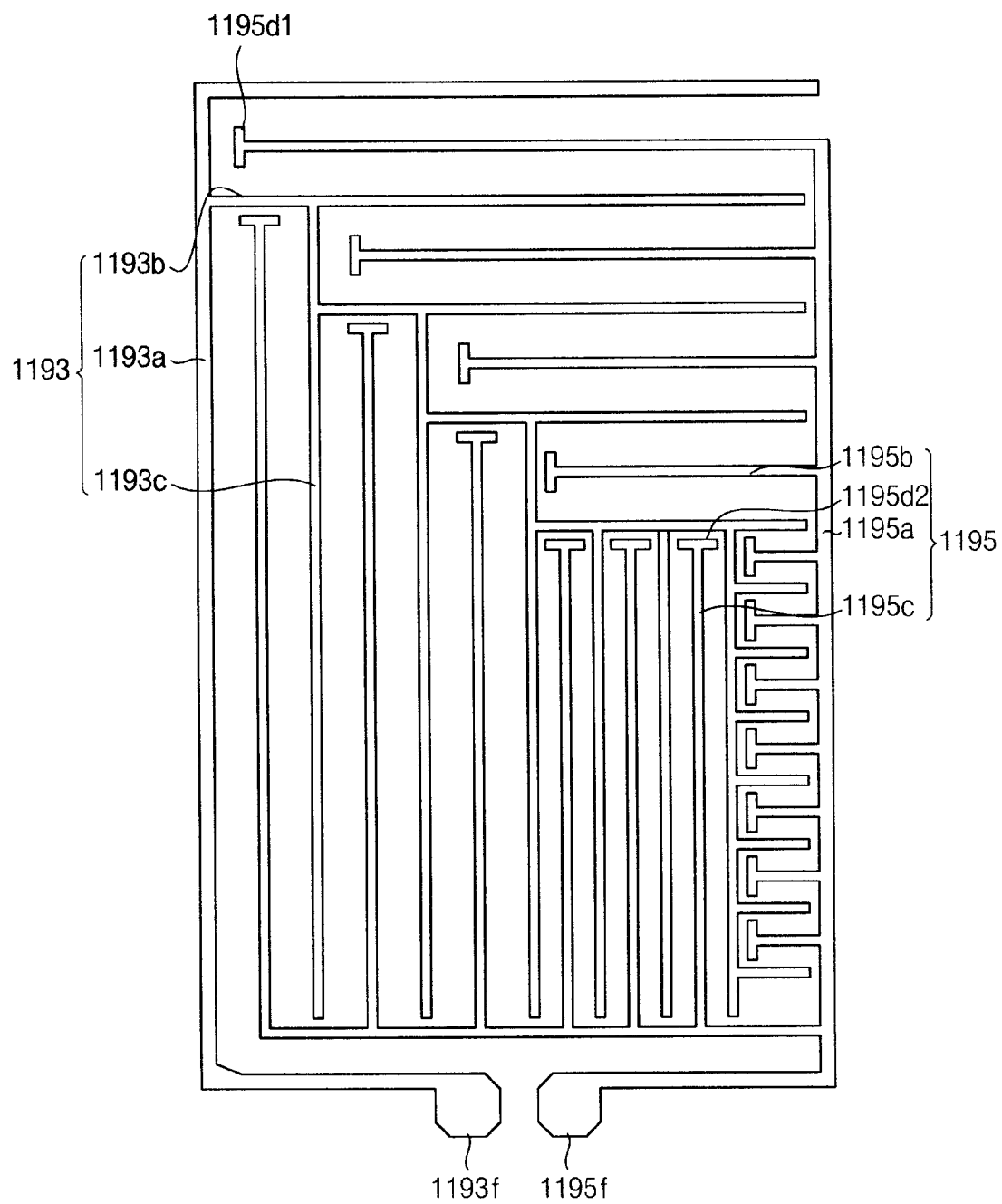

In an array substrate according to an alternative exemplary embodiment shown in FIG. 13, a first pixel electrode 1193 includes a first branch electrode portion 1193b and a second branch electrode portion 1193c, while a second pixel electrode 1195 includes a third branch electrode portion 1195b and a fourth branch electrode portion 1195c, disposed in a similar pattern to the pixel electrode of FIG. 8, except that a number of second branch electrode portions 1193c extend from the first branch electrode portion 1193b and a number of the first branch electrode portions 1193b extend from the second branch electrode portion 1193c in a lower-right corner area of a unit pixel area. In addition, an interval distance between branch electrode portions is narrowed in a lower-right corner area of the unit pixel area, which is different from the exemplary embodiment of the pixel electrode of FIG. 8, and the lower-right corner area thereby includes a high area (described in greater detail above). Thus, the first through fourth branch electrode portions 1193b, 1193c, 1195b and 1195d, respectively, and low areas and high areas form eight domains. In addition, the first pixel electrode 1193 according to an exemplary embodiment further includes a first supporting electrode portion 1193a and a first contact portion 1193f, while the second pixel electrode 1195 further includes a second supporting pixel portion 1195a, a first head portion 1195d1, a second head portion 1195d2, and a second contact portion 1195f, as shown in FIG. 13.

Figure 14:
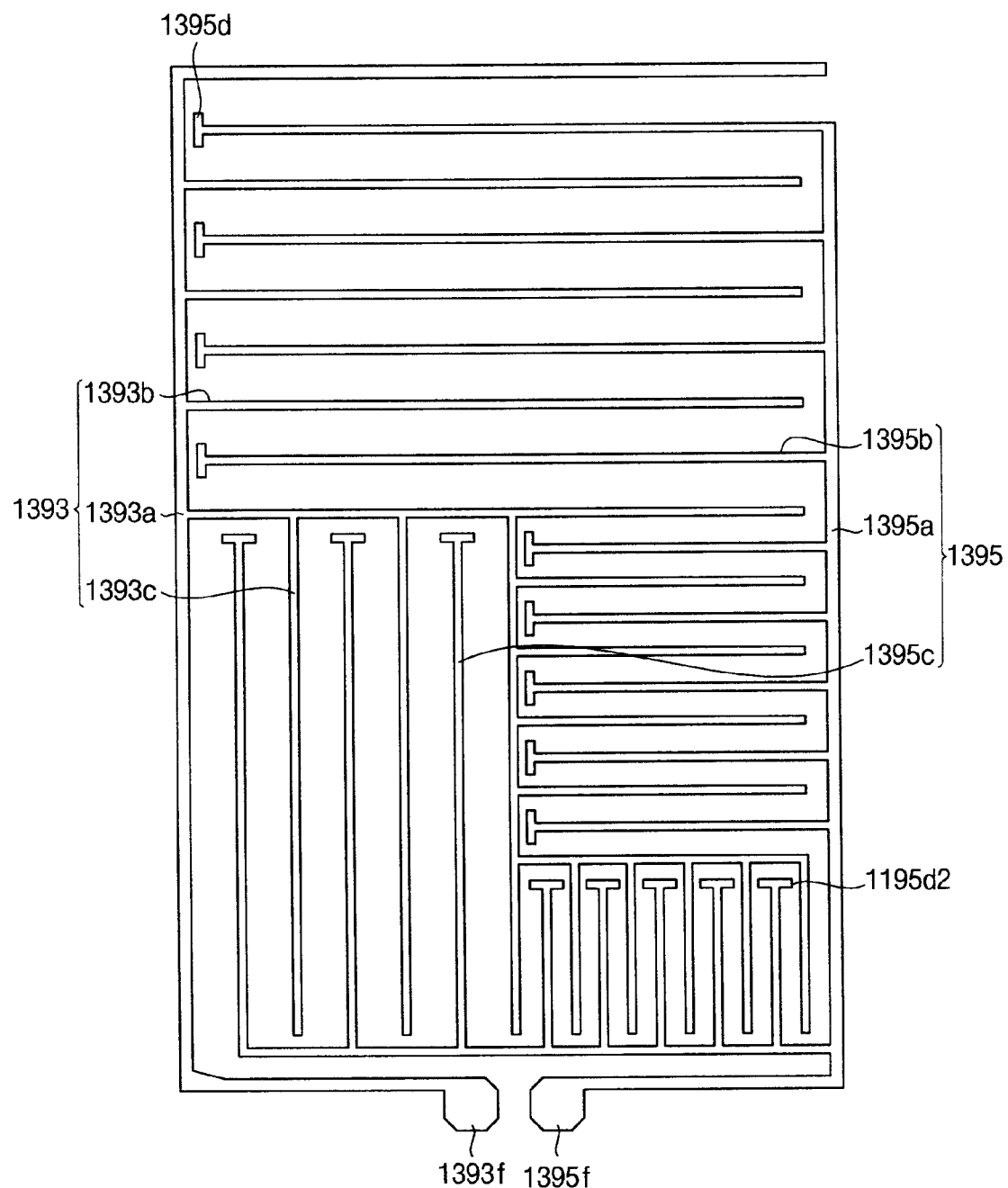

An array substrate according to yet another alternative exemplary embodiment shown in FIG. 14 is similar to the array substrate according to the exemplary embodiment shown in FIG. 11 except that a number of first branch electrode portions 1393b extend from a first supporting electrode portion 1393a of a first pixel electrode 1393 and extend from a second branch electrode portion 1393c, while a number of second branch electrode portions 1393c extend from the second branch electrode portion 1393c in a lower-right corner area of a unit pixel area. In addition, an interval distance between corresponding to branch electrode portions is narrower in a lower-right corner area to form a high area therein. Thus, the first branch electrode portion 1393b and the second branch electrode portion 1393c, as well as a third branch electrode portion 1395b and fourth branch electrode portion 1395c of a second pixel electrode 1395, form low areas and high areas to form eight domains. The second pixel electrode 1395 further includes a second supporting electrode portion 1395a, a first head portion 1395d1, a second head portion 1395d2, and a contact portion 1395f. Likewise, the first pixel electrode 1393 further includes a first contact portion 1393f, as shown in FIG. 14.

It will be noted that shapes of alternative exemplary embodiments of the pixel electrodes shown in FIGS. 8 and 11 through 14 are not limited to the descriptions here, and may, for example, be modified in various ways, such as by changing ratios and/or positions of the low areas and the high areas described above and shown in FIGS. 8 and 11 through 14. However, exemplary embodiments of the pixel electrodes shown in FIGS. 8, 11 through 14 do have a common feature in that a direction of supporting electrode portions and branch electrode portions point forms an angle of about 45 degrees with all polarization direction axes. Therefore, a light-use efficiency of liquid crystals in a display device according to an exemplary embodiment is substantially increased.

Moreover, as described in greater detail above, the first pixel voltage and the second pixel voltage, having different polarities, are alternatively applied to the first pixel electrodes 793, 993, 1193 and 1393 and the second pixel electrodes 795, 995, 1195 and 1395, respectively, and a driving voltage of liquid crystals is thereby substantially increased for given levels of the first pixel voltage and the second pixel voltage (which may therefore be maintained at relatively small values), while a response time of liquid crystals is substantially improved.

According to exemplary embodiments of an array substrate and a display device having the array substrate, textures thereof are substantially decreased, and transmittance thereof is substantially enhanced, while implementation of a multi-domain display is substantially simplified. Moreover, a response time of a liquid crystal layer is substantially enhanced, and a display quality of the display device according to an exemplary embodiment is substantially improved. In an exemplary embodiment, the display device is a liquid crystal display device.

The exemplary embodiments described herein are illustrative of the present invention and are not to be construed as limiting thereof. Rather, these exemplary embodiments are provided so that this disclosure will be thorough and complete and will fully convey the concept of the present invention to those skilled in the art. Although exemplary embodiments of the present invention have been described, it will be understood by those of ordinary skill in the art that various modifications and/or changes in form and details are possible without departing from the spirit or scope of the present invention as defined by the following claims.

What is claimed is:

1. An array substrate comprising:
   a first pixel electrode comprising:
   a first supporting electrode portion;
   a plurality of first branch electrode portions extending from the first supporting electrode portion along a first direction forming an acute angle with a longitudinal axis of the first supporting electrode portion;
   a plurality of second branch electrode portions extending from the first supporting electrode portion along a second direction forming an acute angle with the longitudinal axis of the first supporting electrode portion and crossing the first direction;
   a third branch electrode portion extending from one of the second branch electrode portion adjacent to the first branch electrode portion substantially parallel to the first branch electrode portion; and
   a fourth branch electrode portion extending from the third branch electrode portion substantially parallel to the second branch electrode portion; and
   a second pixel electrode comprising:
   a second supporting electrode portion facing the first supporting electrode portion;
   a plurality of fifth branch electrode portions extending from the second supporting electrode portion between the first branch electrode portion and the third branch electrode portion and between the first branch electrode portions; and
   a plurality of sixth branch electrode portions extending from the second supporting electrode portion between the second branch electrode portion and the fourth branch electrode portion and between the second branch electrode portions.

2. The array substrate of claim 1, wherein longitudinal axes of the first supporting electrode portion and the second supporting electrode portion are substantially parallel to a polarization axis direction of a lower polarizing plate disposed below the array substrate, and
   the first direction and the polarization axis direction cross each other at an angle of about 45 degrees.

3. The array substrate of claim 2, further comprising:
   a first data line substantially parallel to the first supporting electrode portion;
   a second data line substantially parallel to the second supporting electrode portion;
   a first switching element electrically connected to the first data line and the first pixel electrode; and
   a second switching element electrically connected to the second data line and the second pixel electrode.

4. The array substrate of claim 2, wherein a unit pixel area including the first pixel electrode and the second pixel electrode disposed therein comprises:
   a low area in which the first branch electrode portion and the fifth branch electrode portion are spaced apart from the second branch electrode portion and the sixth branch electrode portion by a first interval distance; and
   a high area in which the first branch electrode portion and the fifth branch electrode portion are spaced apart from the second branch electrode portion and the sixth branch electrode portion by a second interval distance less than the first interval distance.

5. The array substrate of claim 4, wherein
   the unit pixel area has a substantially rectangular shape including a side thereof substantially parallel to the polarization axis direction of the lower polarizing plate,
   the high area comprises a first high area disposed in a first corner area of the unit pixel, a second high area disposed in a second corner area, opposite the first corner area, of the unit pixel, and a third high area disposed between the first corner area and the second corner area, and
   the low area comprises a first low area disposed between the first high area and the second high area, and a second low area disposed between the second high area and the third high area.

6. The array substrate of claim 5, wherein the first pixel electrode further comprises:
   a seventh branch electrode portion extending from the fourth branch electrode portion substantially parallel to the third branch electrode portion, the seventh branch electrode portion being spaced apart from the third branch electrode portion by the first interval distance; and
   an eighth branch electrode portion extending from the seventh branch electrode portion substantially parallel to the fourth branch electrode portion, the eighth branch electrode portion being spaced apart from the fourth branch electrode portion by the first interval distance.

7. The array substrate of claim 4, wherein the second pixel electrode further comprises:
   a first head portion extending from an end portion of the fifth branch electrode portion substantially parallel to the second branch electrode portion between the first branch electrode portion and the third branch electrode portion; and
   a second head portion extending from an end portion of the sixth branch electrode portion substantially parallel to the third branch electrode portion between the second fourth branch electrode portion and the fourth branch electrode portion.

8. A display device comprising:
an array substrate comprising:
a first pixel electrode comprising:
- a first supporting electrode portion;
- a plurality of first branch electrode portions extending from the first supporting electrode portion along a first direction forming an acute angle with a longitudinal axis of the first supporting electrode portion;
- a plurality of second branch electrode portions extending from the first supporting electrode portion in a second direction forming an acute angle with the longitudinal axis of the first supporting electrode portion and crossing the first direction;
- a third branch electrode portion extending from one of the second branch electrode portions adjacent to the first branch electrode portion substantially parallel to the first branch electrode portion; and
- a fourth branch electrode portion extending from the third branch electrode portion substantially parallel to the second branch electrode portion; and a second pixel electrode comprising:
- a second supporting electrode portion facing the first supporting electrode portion;
- a plurality of fifth branch electrode portions extending from the second supporting electrode portion between the first branch electrode portion and the third branch electrode portion and between the first branch electrode portions; and
- a plurality of sixth branch electrode portions extending from the second supporting electrode portion between the second branch electrode portion and the fourth branch electrode portion and between the second branch electrode portions;

an opposite substrate facing the array substrate; and
a liquid crystal layer disposed between the array substrate and the opposite substrate.

9. The display device of claim 8, further comprising:
a lower polarizing plate disposed below the array substrate and including a first polarization axis inclined from one of the first direction and the second direction by an angle of about 45 degrees; and
an upper polarizing plate disposed on the opposite substrate and including a second polarization axis substantially perpendicular to the first polarization axis, wherein the first direction is substantially perpendicular to the second direction.

10. The display device of claim 9, wherein the array substrate further comprises:
- a first data line connected to a first switching element and disposed substantially parallel to one of the first polarization axis and the second polarization axis;
- a second data line connected to a second switching element and disposed substantially parallel to the first data line; and
- a gate line connected to the first switching element and the second switching element.

11. The display device of claim 8, wherein a unit pixel area in which the first and second pixel electrodes are disposed comprises:
- a low area in which the first branch electrode portion and the fifth branch electrode portion are spaced apart from the second branch electrode portion and the sixth branch electrode portion by a first interval distance; and
- a high area in which the first branch electrode portion and the fifth branch electrode portion are spaced apart from the second branch electrode portion and the sixth branch electrode portion by a second interval distance less than the first interval distance.

12. The display device of claim 11, wherein the second pixel electrode further comprises:
- a first head portion extending from an end portion of the fifth branch electrode portion substantially parallel to the second branch electrode portion between the first branch electrode portion and the third branch electrode portion; and
- a second head portion extending from an end portion of the sixth branch electrode portion substantially parallel to the third branch electrode portion between the second branch electrode portion and the fourth branch electrode portion.

13. The array substrate of claim 1, wherein the second branch electrode portion extending from the first supporting electrode portion along a second direction is substantially perpendicular to the first direction.

14. The display device of claim 8, wherein the second branch electrode portion extending from the first supporting electrode portion in the second direction is substantially perpendicular to the first direction.

* * * * *